US011765666B2

(12) United States Patent
Grabelkovsky et al.

(10) Patent No.: US 11,765,666 B2
(45) Date of Patent: Sep. 19, 2023

(54) DEVICES AND METHODS FOR WIRELESS TRANSMISSION POWER CONTROL

(71) Applicant: Intel Corporation, Santa Clara, CA (US)

(72) Inventors: Michael Grabelkovsky, Netanya (IL); Gil Meyuhas, Tel-Aviv (IL)

(73) Assignee: Intel Corporation, Santa Clara, CA (US)

( * ) Notice: Subject to any disclaimer, the term of this patent is extended or adjusted under 35 U.S.C. 154(b) by 109 days.

(21) Appl. No.: 17/391,047

(22) Filed: Aug. 2, 2021

(65) Prior Publication Data

US 2022/0104144 A1    Mar. 31, 2022

(30) Foreign Application Priority Data

Sep. 25, 2020   (EP) .................................... 20198383

(51) Int. Cl.
*H04W 52/24* (2009.01)
*H04B 1/3827* (2015.01)

(52) U.S. Cl.
CPC .......... *H04W 52/24* (2013.01); *H04B 1/3838* (2013.01)

(58) Field of Classification Search
CPC ............................. H04W 52/24; H04B 1/3838
See application file for complete search history.

(56) References Cited

U.S. PATENT DOCUMENTS

| | | | |
|---|---|---|---|
| 10,447,413 B1 | 10/2019 | Guckian et al. | |
| 2003/0028875 A1 | 2/2003 | Piotrowski | |
| 2003/0228875 A1* | 12/2003 | Alapuranen | H04W 52/225 455/500 |
| 2012/0176979 A1 | 7/2012 | Cho et al. | |
| 2015/0031408 A1* | 1/2015 | Kalla | H04W 52/367 455/522 |
| 2015/0063131 A1 | 3/2015 | Kennedy et al. | |
| 2020/0213952 A1* | 7/2020 | Wang | H04W 52/30 |

OTHER PUBLICATIONS

European Search Report issued for the corresponding European Patent Application No. 20 198 383.0, dated Mar. 19, 2021, 10 pages (for informational purposes only).

* cited by examiner

*Primary Examiner* — Keith Ferguson
(74) *Attorney, Agent, or Firm* — VIERING, JENTSCHURA & PARTNER MBB

(57) ABSTRACT

To control transmit power in a wireless device, the wireless device sends a data indication signal to the network adaptor. The data indication signal can indicate a transmission status of data to be transmitted and being located in at least one queue of a network stack of a computing device of wireless device. The network adaptor can determine using a time-averaged specific absorption rate (SAR) function, a transmit power for wireless transmission of data in the network adaptor by considering at least the data in the network adaptor and the at least one data indication signal.

17 Claims, 5 Drawing Sheets

DEVICES AND METHODS FOR WIRELESS TRANSMISSION POWER CONTROL

CROSS-REFERENCE TO RELATED APPLICATION

This application claims priority under 35 U.S.C. § 119 to EP Patent Application No. 20198383, filed on Sep. 25, 2020, which is incorporated by reference herein in its entirety.

TECHNICAL FIELD

Various aspects of this disclosure generally relate to communication systems, and to managing transmission power.

BACKGROUND

Time-averaging specific-absorption-rate (SAR) algorithms (TAS algorithms) compute a time-averaged SAR over a predefined time window using past transmitter power levels. The TAS algorithms or functions are designed to exploit transmit energy over averaging time, as defined by regulatory rules, there is a risk of allowing a network adaptor or a network interface card (NIC) to transmit above non-average SAR limits, since by allowing that and not knowing if in the near future the MC will have more data to transmit the TAS can reach the total SAR budget for the averaging window and that causes the rest of the data to suffer high backoffs, either power or time backoffs, in order not to violate the regulatory limits.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which.

DESCRIPTION

Figure 1:
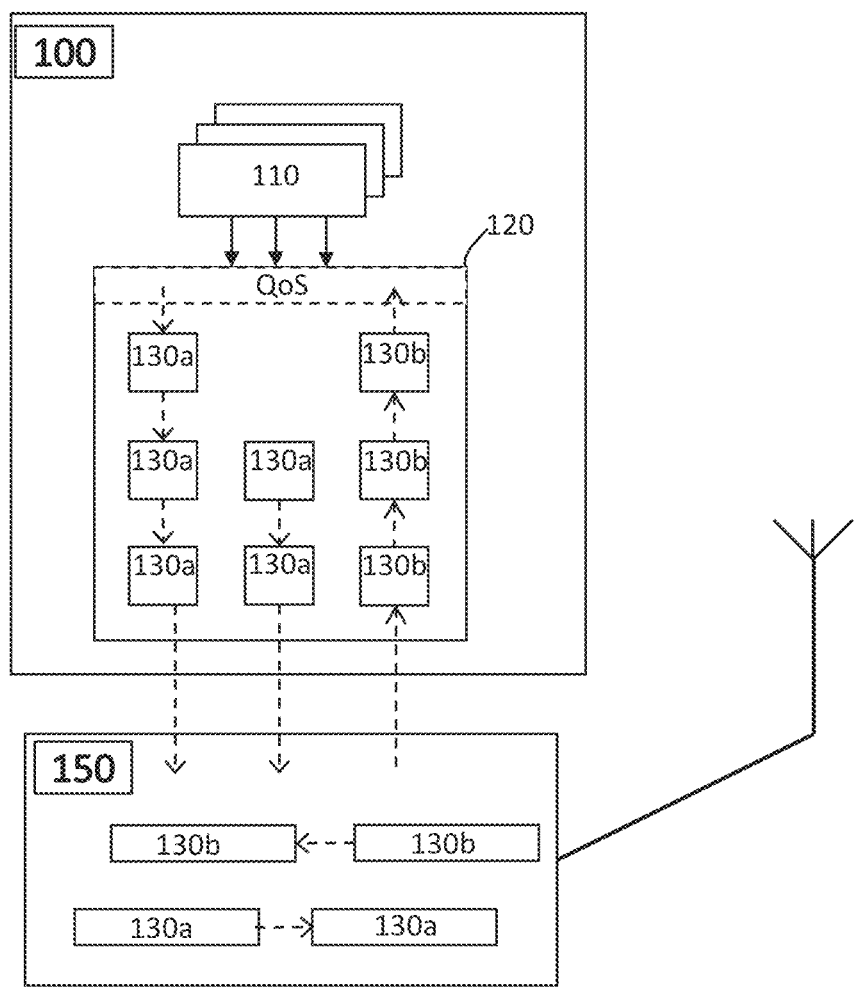
FIG. 1 shows a computing device coupled to a network adaptor.

The following detailed description refers to the accompanying drawings that show, by way of illustration, exemplary details and aspects in which the invention may be practiced.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The phrases "group (of)", "set (of)", "collection (of)", "series (of)", "sequence (of)", "grouping (of)", etc., and the like in the description and the claims, if any, refer to a quantity equal to or greater than one, i.e., one or more. The phrases "proper subset", "reduced subset", and "lesser subset" refer to a subset of a set that is not equal to the set, illustratively, referring to a subset of a set that contains fewer elements than the set.

The phrase "at least one of" with regard to a group of elements may be used herein to mean at least one element from the group, including the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in the form of a pointer. However, the term "data" is not limited to the examples mentioned above and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit, and may also be referred to as a "processing circuit," "processing circuitry," among others. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality, among others, and conversely that any single processor, controller, or logic circuit described herein may be realized as two (or more) separate entities with equivalent functionality, among others.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "send," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the processors or controllers perform the logical transmission and reception over the software-level connection. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

As used herein, a signal that is "indicative of" a value or other information may be a digital or analog signal that encodes or otherwise communicates the value or other information in a manner that can be decoded by and/or cause a responsive action in a component receiving the signal. The signal may be stored or buffered in a computer-readable storage medium prior to its receipt by the receiving component. The receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be regarded as referring to the transmit signal in baseband, intermediate, and radio frequencies.

FIG. 1 shows a computing device 100 operably coupled to a network adaptor 150. The computing device may include at least one processor and memory (not shown). One or more applications 110 may be implemented or executed by the computing device 100. These applications 110 may include application programs that communicate wirelessly to another device or, for example, to a network, using the network adaptor 150. The network adaptor 150 may be a component with circuitry that enables the computing device 100 to communicate with a network or other devices.

The computing device 100 may be any device including at least one processing circuit and configured to communicate wirelessly, e.g., a smartphone, a tablet device, a desktop or personal computer, a mobile phone, a laptop, a netbook computer, a workstation, a server, a mobile medical device, a camera, a wearable device, an Internet-of-Things (IoT) device, etc.

The computing device 100 implements communications protocols. Accordingly, the computing device 100 can include or realize a network stack 120. The network stack 120 may include or realize layers but is not limited to layers of the Open Systems Interconnection model (OSI model). The computing device 100 may implement or realize some or all layers above the data link layer, including layer such as upper layers such as the network layer, transport layer, session layer, presentation layer, application layers. The computing device 100 may implement other protocols and may include TCP/IP layers. As shown in FIG. 1, the network stack 120 includes queues filled to some extent with transmit data (Tx) or Tx packets 130a and receive (Rx) data or Rx packets 130b.

The network adaptor 150 or network interface card (MC) is capable of or configured to wirelessly transmit and receive data, e.g., packets of data to connect the computing device 100 to a computer network. The network adaptor 150 can include electronic components for realizing communication and can implement a physical layer and a data link layer (e.g., including a Medium Access Control (MAC) layer). For simplification, components, such as receiver, transmitter, processing circuitry, and other network adaptor components are omitted.

The computing device 100 may communicate and interface with the network adaptor 150 using a device driver to obtain and provide data. The computing device 100 can include a driver, which can implement, for example, a Quality of Service (QoS) function for separating data to be transmitted in the computing device 100 before sending the data to the network adaptor 150 to be transmitted.

Network adaptor such as the network adaptor 150 can calculate a signal strength bound using the amount or quantity of data in a buffer or queue of the network adaptor 150. The network adaptor 150 can determine a transmit power based on the amount of data waiting to be transmitted inside a buffer of a MAC layer of the network adaptor 150 and based on the amount of data transmitted in the last or previous period. In particular, the network adaptor 150 utilizes time-averaged SAR (TAS) functions for determining transmit power.

TAS functions are used in network adaptors or network interface cards due to determine the amount of radiation a device is allowed to expose to users, which is measured by specific absorption rate (SAR). The SAR is now measured or calculated in a time-averaged manner. Known TAS functions for determining transmit power use or only rely on information from inside a network adaptor or NIC. Such network adaptors, to optimize managing power consumption, may either predict or assume there an amount of data load for transmitting in the upper stack layers and act upon such assumption. However, in some cases, there will be a false or inaccurate prediction. False or incorrect predictions can cause a regulatory violation. As a result, network adaptor may limit the transmission power up to a level to ensure they will be able to compensate any deficits due to spent energy. Some network adaptors utilize a TAS function without any prediction, and just ensures operation within safety margins and/or base its knowledge only on history. In either case, the transmission power allocation will be less effective and less optimized.

While, as previously mentioned, the QoS function of the computing device 100 may separate the data to be transmitted into different queues of upper layers of the network stack 120, the network adaptor 150 and the lower layers (e.g., physical or data link layers) of the network adaptor 150 do not know the status of upper stack layers.

Figure 2:
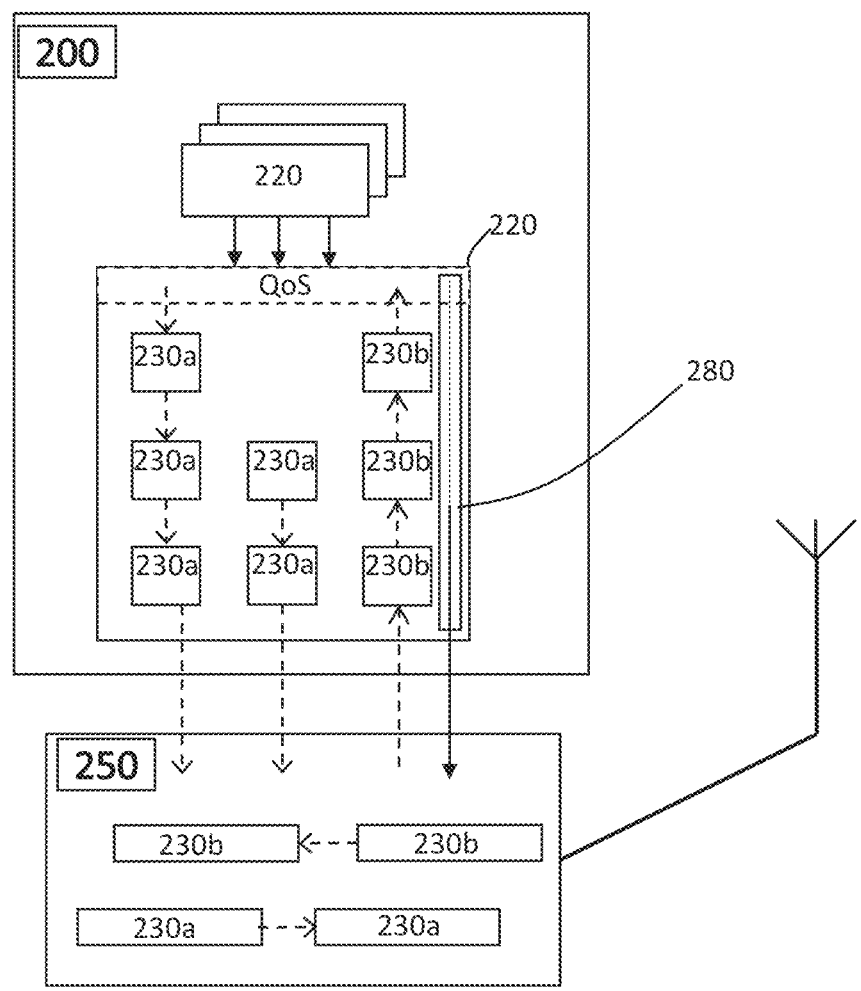
FIG. 2 shows a computing device and network adaptor according to at least one exemplary embodiment of the present disclosure.

FIG. 2 shows a computing device 200 and network adaptor 250 according to at least one exemplary embodiment of the present disclosure. The computing device 200 and the network adaptor 250 may be similar in many aspects to the computing device 100 and the network adaptor 150 of FIG. 1. Thus, similar elements may have the same reference numbers except with the leading digit differing, e.g., (lxx for FIGS. 1 and 2xx for FIG. 2).

The computing device 200 can be configured to provide indications of data of the upper levels of the network stack 220 to the network adaptor. The indication can include but is not limited to, information of data queues states, and fullness of queues inside network stack 220, and optionally throughput and/or Quality of Service (QOS) demand of applications throughput. Upper-level network protocols or upper layers may know these types of information.

While FIG. 2 shows a QoS driver implemented in the computing device 200; however, this may not necessarily be included. Further, the network stack 220 may include a Network Driver Interface Specification (NDIS) driver stack. The computing device 200 can include a driver (e.g., a Windows driver for a PC in one example) for interfacing between a network stack 220 and the network adaptor 250. In embodiments, the driver may be responsible for managing data queues of the network stack and can obtain or receive certain information from a network stack needed for implementing the devices and methods described herein, e.g., data load or data queue fullness (e.g., FIFO fullness), data categories, throughput demands, QoS demands, etc. In some cases, certain information for the data indication signals may not be sent directly from the network stack 220. Some data indication signals, e.g., related to upper layers of a network stack, may be sent to the network adaptor 200 from the operating system (OS) or one or more applications of the computing device. Such data signals thus may bypass the network stack 220.

In general, the data indication signal or the information thereof may be transferred or passed from the computing device 200 to the network adaptor 250 in any suitable manner. The data indication signals may be transferred or sent to the network adaptor directly (e.g., using communication interface represented by 280) or indirectly. In one example, data load status or other information of data in the upper layers of the network stack may be transferred to the network adaptor 250, e.g., to a MAC or PHY indirectly using a sticky header for each data packet from upper layers which can indicate the current upper layer load status.

According to at least one embodiment of the present disclosure, data indication signals may be sent or transmitted to the network adaptor 250 in response to a trigger signal. That is, a trigger signal sent to the computing device 200 can cause the computing device 200 to send data indication signals to the network adaptor 250.

The network adaptor 250 can be configured to utilize these data indication of data to be transmitted to optimize the usage of a transmitting energy budget under TAS. The data indications can be used by a TAS function or algorithm implemented by the network adaptor 250 to allow the network adaptor 250 to (wirelessly) transmit more data at a higher or maximum power level in jurisdictions subject to SAR regulatory. This avoids the transmit power being at lower power and limited by a non-TAS SAR limit (such as fixed SAR limit that is not averaged over time).

A TAS function determines transmit power for time periods so that the time-averaged SAR limit is not exceeded. The TAS function can be implemented in the MAC or physical layers of the network adaptor 250 to average SAR over time as per lately regulation definitions. It may determine a maximum transmit power based on the actual transmit duty-cycle of the data. As the actual duty cycle is lower, it allows bursts of data to be sent with a higher power. A TAS algorithm can enable a network adaptor to transmit above fixed non-averaged-SAR power levels either by granting or allocating unused energy from the near past, or by allowing a deficit of energy by limiting the deficit to a certain amount and handling it in time to limit the transmission before violating the averaging defined by the SAR regulations. In this case a deficit of energy means deficit from the TAS set safety margins as a TAS algorithm not permitted to cause a deficit that violates regulatory settings.

In embodiments, herein, the TAS function may be modified to consider the data to be transmitted in the computing device, e.g., data in queues of upper layers of the network stack 250 of the computing device 200.

In embodiments of the present disclosure, the computing device can transmit indication or indications regarding data from layers of the network stack 250 (e.g., upper layers seven-layer networking model in one example) directly to the lower MAC or PHY layers. The indications can include the transmission status of data to be transmitted and located in the network stack 250. The indications can be sent directly to the network adaptor, e.g., directly to a MAC layer, and directly to a TAS function in the network adaptor 250.

A data indication or data indication signal from the computing device 200 may indicate the transmission status of data in the network stack. In one example, the data indication may indicate a data load of the network stack 250 or indicate how much data or how much of a queue or queues of the network stack 250 are occupied by data for transmission. The network adaptor 250 obtains these data indication signals. Thus, the TAS function will have the knowledge, in one example, that an upcoming particular time interval will not have any data to transmit. In such a case the TAS can raise the power level of the transmit power for data held in the MAC lower layer of the network adaptor 250 because it can calculate and know how much energy it will gain in the near future by not having to transmit data from the upper layers in the interval. Further, the SAR averaged in a sliding window will not violate the maximum allowed energy integral allowed by regulatory authorities.

Data indications can include information relating to various layers of the OSI network model, such as, but not limited to, Network-layer, Transport-layer, Session-layer, Application-layer, etc.

In one example, if the computing device 200 sends a data indication signal indicating regarding fullness (e.g., FIFO fullness) of a queue of a layer of the network stack 220, e.g., indicating that the queue is almost empty, then the TAS function in the MAC layer of the network adaptor 250 can use such information to calculate a minimum time where there will not be data sent into the network adaptor 250 for transmission. The network adaptor 250 can grant the data already in MAC layer (e.g., FIFO queue) to fully use the remainder of a current energy budget for transmitting the data in the MAC layer in an upcoming time interval because there will not be any transmission of data from the layer of the network stack 220 in the computing device 200.

In embodiments of the data indication can indicate other types of information regarding the transmission status of data in the network stack 250 to be transmitted. For example, the data indication can indicate a quality of service (QoS) demand associated with the data to be transmitted in the network stack 250, and/or a throughput demand associated with the data to be transmitted, one or more categories related to the data to be transmitted. The network stack 220 can inform the network adapter 250 about data queues states and fullness level inside network stack 220, throughput demand of applications, or access categories for the queued data. In some cases, a QoS driver of the computing device 200, or any other entity that manages the data queues in any of the upper stack layers of the network stack, may collect this information and send appropriate indicators directly to the network adaptor 250.

The network adaptor can use this information 250, e.g., by the TAS function in a MAC layer of the network adaptor 250 for managing power consumption in a manner to exploit the limited transmit power budget, without causing damage of backoffs to current data or later data in stack, and allows a smooth usage of the transmit power usage that can be spread in an even and weighted manner, compared to the case where there is no such knowledge. In short, the network adaptor 220, using the TAS function, can determine a transmit power for transmission of data in the network adaptor by considering at least the data in the network adaptor and the one or more data indication signals.

The TAS function may or instead determine a time backoff as a means to control spent energy by preventing transmission for certain amount of time. Further, the network adaptor 250 determines this transmit power so that it does not cause a time-averaged SAR of transmission power over an averaging sliding window covering the transmission of data in the network adaptor and potential transmission of data in the at least one queue to exceed a threshold limit. Further, in other embodiments, the TAS function may NOT be implemented or exclusively implemented the MAC layer of the network adaptor, but in any other suitable layer, such as in layers between the MAC and driver layers. That is, the implementation of the TAS function may be partitioned between the network adaptor 250 and the computing device 200 (e.g., by the network adaptor driver in one example).

In at least one exemplary embodiment of the present disclosure, the network adaptor 250 determines the transmit power for data in the MAC layer using a TAS function by being configured to determine an amount of future energy indicating an amount of an energy budget available for transmission of the data in the network adaptor 250 and data in the computing device 200 (e.g., energy budget for data in all (network) stack layers from both the computing device 200 and network adaptor 250). This determined future energy can represent a maximum amount of energy allowed to be consumed an upcoming time interval by subtracting energy already spent (e.g., from a current or immediately previous transmission) from the energy budget. The energy used or for a time interval may be calculated or determined by using a sliding window that moves in time with sum the energy in this time window, e.g., the total integral, must not go over budget limit.

Accordingly, the future energy (MaxFutureEnergy) can be determined because it is a function of currently spent power (CurrentSpentEnergy) which is known and the energy budget (BudgetEnergy) which is also known:

$$BudgetEnergy - CurrentSpentEnergy = MaxFutureEnergy$$

The BudgetEnergy may be known as the regulatory aggregated power limit and maybe defined in terms of average power or total energy (where energy=power*time).

The future energy can be determined by either by moving average, or moving integral, using a sliding window moving forward in time wherein the total sum of energy, e.g., the sum of the current energy and future energy in a window of time covering present and future is less than or equal to the total energy budget (BudgetEnergy).

From the knowledge of the MaxFutureEnergy, a target power can be determined by the network adaptor 250 using the knowledge of the data in the network adaptor and the data in the computing device (e.g., from the indication signals). Specifically, the target power (TargetPower) is a function of the transmission rate and amount of data in the queue to be transmitted. While the network adaptor 250 can already know or access the data load for the data in the network adaptor 250 (e.g., in the MAC), the indication signals can inform the network adaptor 250 about the transmission status of the data in the network stack 220. The target power can be deduced using the equation:

$$TargetPower = (BudgetEnergy - CurrentSpentEnergy) * TxRate/DataInQueue$$

The target power (TargetPower) can be used to determine transmit power for both the data in the network adaptor 250 and the computing device 100. Accordingly, this target power can then be allocated by the network adaptor 250.

In at least one example, the determined target power may be used or allocated in a weighted manner, e.g., based on the amount of data in the network adaptor (e.g., in the MAC) and in the network stack 220 for transmission. The allocation may also be weighted depending on the demands of the application associated with the data. Transmission of certain types of data for certain types of applications may require more power usage. This allocation can be based on the indication signals and the information already known about the data in the network adaptor 250.

In one example, the indication signals may indicate that there is no or little data in the network stack 220 of the computing device 200. Accordingly, the transmit power for transmitting the data in the network adaptor 250 may be maximized in this instance to consume or use all of the determined target power without violating any regulation regarding SAR limits or energy budget limits.

In accordance with at least one or more embodiments of the present disclosure, the computing device 200 sends the data indication signals regarding the transmission status of data in the network stack 250. In embodiments, the computing device 200 includes a communication interface 180 to send the data indication signals to the network adaptor 250. In various examples, the data indication signals can be sent directly to the MAC or physical layer (PHY) of the network adaptor 250 using the communication interface. The data indication signals can be sent from the network stack 220, e.g., using a driver, e.g., a QoS driver, or any suitable program logic or entity involved in managing ques of the network stack. Such an entity may collect information regarding the data in the network layer queues (e.g., fullness, data type, etc.) and send this information to the network adaptor in data indication signals. Then a TAS function implemented in the network adaptor 250 can then use the information from these indications signals as described herein.

In embodiments, the computing device 200 may send the data indication signals repeatedly, such as, for example, as the data in the network stack changes. In some cases, the computing device 200 may send one or more data indication signals in response to a prompt by the network adaptor 250.

That is, the network adaptor 250 may send a signal requesting a data indication signal to be sent to the network adaptor.

Figure 3:
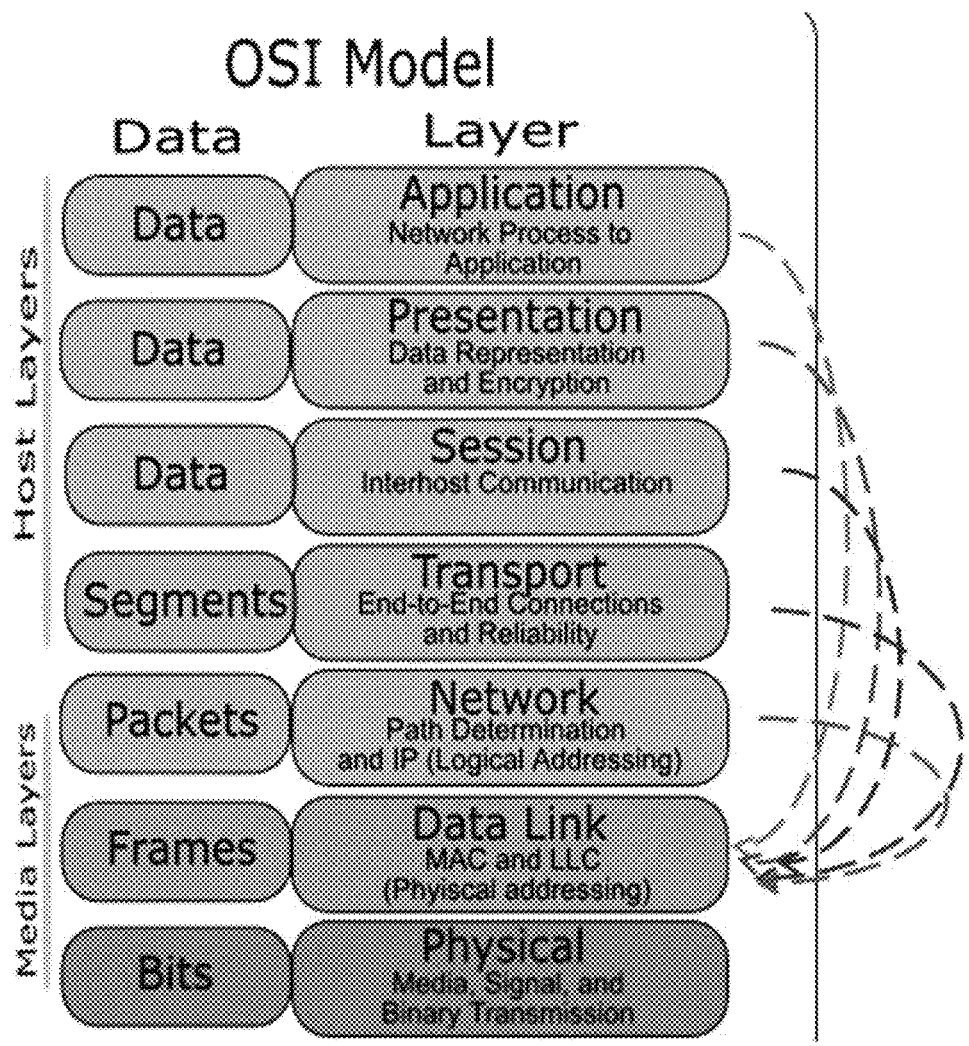
FIG. 3 shows a representation of data indication signals being transferred from the network stack layers according to at least one exemplary embodiment of the present disclosure.

In the example of the OSI model being implemented by the computing device 200, FIG. 3 shows a representation of data indication signals 310 being sent from the network stack layers directly to the MAC layer or a data link layer of the network adaptor 250. Of course, not all the layers of the OSI model may be implemented by the computing device 200. Further other or similar types of layers associated with different communication protocols may also be used or realized in the network stack of 220 of the computing device 200 and can also be configured to transmit data indications as explained herein.

Figure 4:
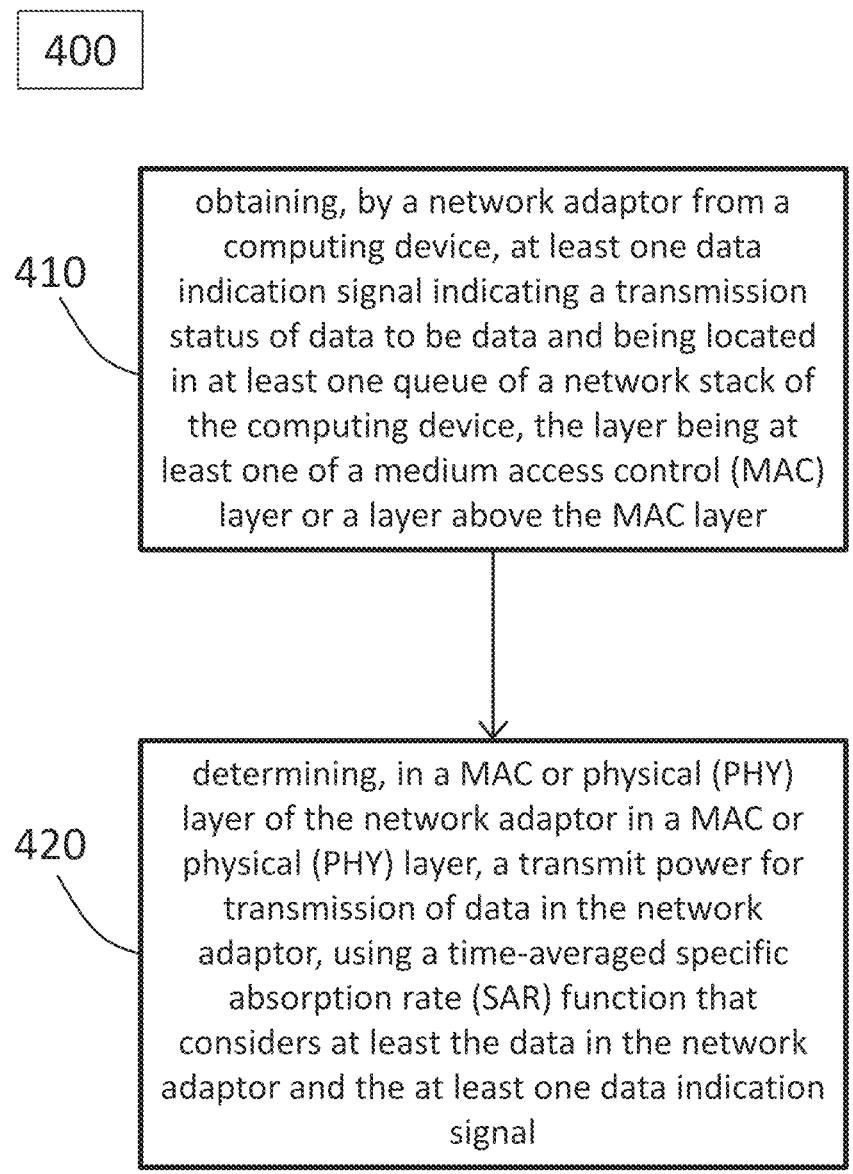
FIG. 4 shows a method according to at least one exemplary embodiment of the present disclosure.

FIG. 4 shows a method 400 according to at least one exemplary embodiment of the present disclosure. The method may be implemented by devices or systems described herein or any other suitable device. For example, the method may be performed by a device such as or similar to the device of FIG. 2.

The method can include at 410, obtaining, by a network adaptor from a computing device, at least one data indication signal indicating a transmission status of data to be transmitted and located in at least one queue of a network stack of the computing device, the layer being at least one of a medium access control (MAC) layer or a layer above the MAC layer. At 420 the method includes, determining, in a MAC or physical (PHY) layer of the network adaptor in a MAC or physical (PHY) layer, a transmit power for transmission of data in the network adaptor, using a time-averaged (TA) specific absorption rate (SAR) function that considers at least the data in the network adaptor and the at least one data indication signal.

Figure 5:
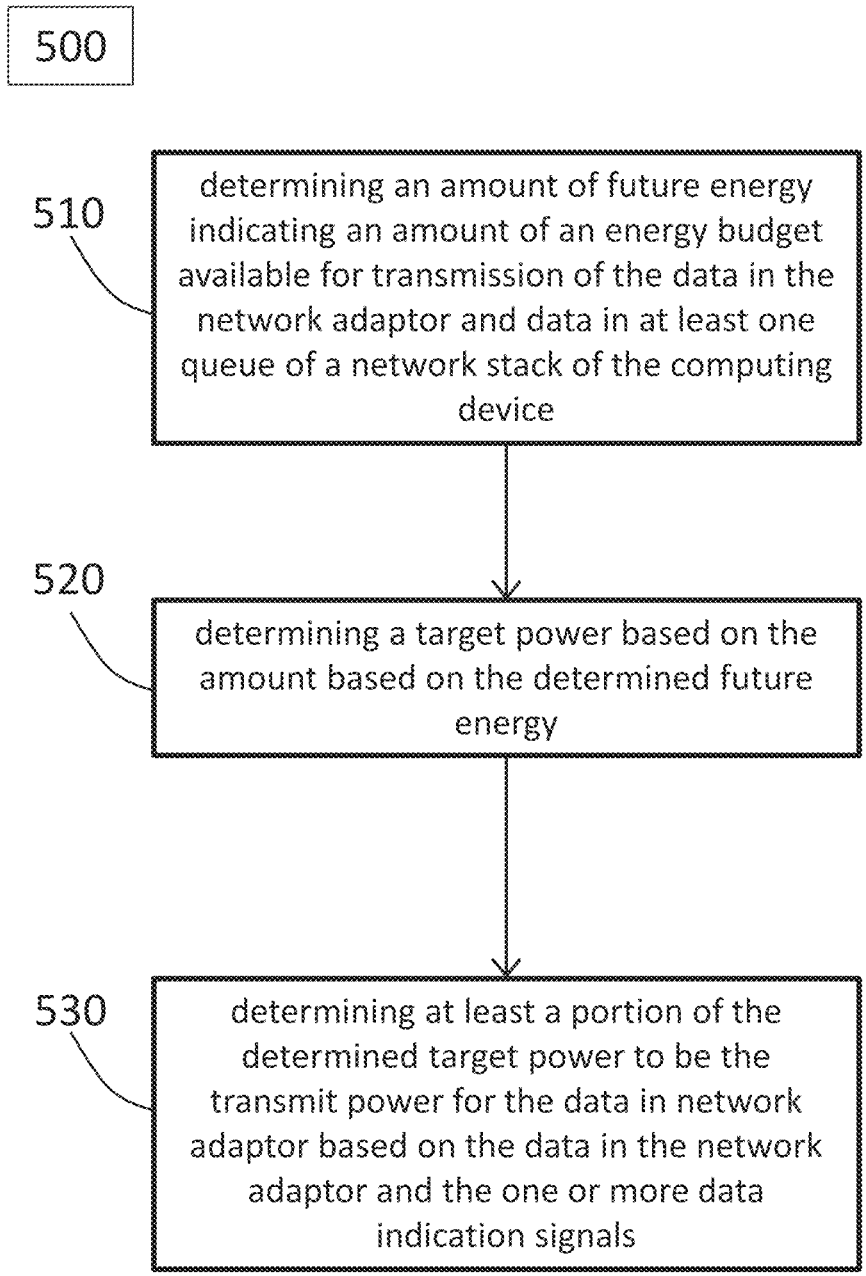
FIG. 5 shows a method according to at least one exemplary embodiment of the present disclosure.

FIG. 5 shows a method 500 according to at least one exemplary embodiment of the present disclosure. The method 500 may be implemented by devices or systems described herein and may be implemented in conjunction with methods described herein. For example, the method may be applied to step 420 of FIG. 4. The method 500 involves using a TAS function to determine a transmit power or a time-backoff. Time-backoff is another way to control spent energy by preventing transmission for a certain time, e.g., so that a SAR regulatory limit is not breached or violated. The transmit power may be determined for a particular sliding window of moving average or moving power integral. The method includes, at 510, determining an amount of future energy indicating an amount of an energy budget available for transmission of the data in a network adaptor and data in at least one queue of a network stack in the computing device. At 520, the method includes determining a target power based on the amount based on the determined future energy. In embodiments, this may be done in a MAC or physical (PHY) layer of the network adaptor in a MAC or physical (PHY) layer. In other cases, this determination of transmit (e.g., using TAS function) may be partitioned or implemented in part between the network adaptor and the computing device, such as for example, by the driver for the network adaptor.

In some cases, instead of proceeding to 520, the method may proceed to 520a and determining a time-backoff and preventing transmission for the determined time backoff.

Then at 530, the method includes determining at least a portion of the determined target power to be the transmit power for the data in network adaptor based on the data in the network adaptor and the one or more data indication signals.

The devices or methods described herein can allow the network adaptor to allow for maximizing the signal strength for transmissions. For example, the devices or processes in the present disclosure can allow for longer higher power transmission burst durations or allow transmission while in devices not using such a method would be required to implement or place a time-backoff. Also, the devices and methods herein can allow for shorter latencies, including decreasing latencies for time-critical protocols. Further, the devices or processes described herein can allow for an increase in transmitted data throughput, increase in connectivity range, and improve cell and spectral density of wireless cells by reducing time spent on transmission over the air.

By using high or upper stack layers' throughput demand indications, such as data (e.g., queue or FIFO fullness and/or access categories of the data in each queue/FIFO buffer) the lower level MAC TAS functions can manage power consumption in a manner that allow to exploit to the limit the transmit power budget, without causing damage of back offs to current or later data in stack, and allow to smooth the transmit power usage and spread it in an even and weighted manner, compared to the case where there is no such knowledge. When such knowledge is missing, the TAS function must limit the amount of power spent over time since it must predict future data loads, whereas with such indication it can have this knowledge.

In the following, various aspects of the present disclosure will be illustrated:

Example 1 is a wireless device including: network adaptor; a computing device operably coupled to the network adaptor, the computing device configured to: send at least one data indication signal to the network adaptor, the at least one data indication signal indicating a transmission status of data to be transmitted and being located in at least one queue of a network stack of the computing device, the layer being at least one of a medium access control (MAC) layer or a layer above the MAC layer; wherein the network adaptor is configured to: determine, in a MAC or physical (PHY) layer of the network adaptor using a time-averaged specific absorption rate (SAR) function, a transmit power for transmission of data in the network adaptor by considering at least the data in the network adaptor and the at least one data indication signal.

Example 2 is the subject matter of Example 1, wherein the network adaptor optionally further configured to determine transmit power that does not cause a time-averaged SAR of transmission power over an averaging sliding window covering transmission of data in the network adaptor and potential transmission of data in the at least one queue to exceed a threshold limit.

Example 3 is the subject matter of Example 1 or 2, wherein to determine the transmit power using the time-averaged SAR function may include to: determine an amount of future energy indicating an amount of an energy budget available for transmission of the data in the network adaptor and data in the computing device for a sliding window, determine a target power for the sliding window based on the determined future energy; and determine at least a portion of the determined target power to be the transmit power based on the data in the network adaptor and the one or more data indication signals.

Example 4 is the subject matter of any of Examples 1 to 3, wherein the transmit power may be determined so that transmission power is allocated between transmission for the data in the network and transmission for the data located in at least one queue so as to maximize an amount of time-averaged SAR budget used for over averaging sliding window covering transmission of data in the network adaptor and transmission of data in the at least one queue.

Example 5 is the subject matter of any of Examples 1 to 4, wherein the computing device may be operably coupled to the network adaptor via a communication interface, and wherein the computing device may be configured to send the at least one data indication signal to the MAC or PHY layer of the network adaptor via the communication interface.

Example 6 is the subject matter of any of Examples 1 to 5, wherein the computing device may be configured to obtain a trigger signal and further configured to send the at least one data indication signal to the network adaptor in response to obtaining the trigger signal.

Example 7 is the subject matter of Examples 1 to 6, wherein the at least one data indication signal may further indicate a quantity of data in the at least one queue in the network stack of the computing device that are buffering the data to be transmitted, and wherein to determine the transmit power for the comprises allocating the t.

Example 8 is the subject matter of any of Examples 1 to 7, wherein the at least one data indication signal may further indicate a quality of service (QoS) demand associated with the data to be transmitted.

Example 9 is the subject matter of any of Examples 1 to 8, wherein the at least one data indication signal may further indicate a throughput demand associated with the data to be transmitted.

Example 10 is the subject matter of any of Examples 1 to 9, wherein the at least one data indication signal may further indicate one or more categories associated with the data to be transmitted.

Example 11 is the subject matter of any of Examples 1 to 10, wherein the network adaptor may be further configured to wirelessly transmit the data in the network adaptor at the determined transmit power.

Example 11A is the subject matter of any of Examples 1 to 11, wherein to determine the transmit power for transmission of data in the network adaptor comprises to allocate in a weighted manner transmission power between transmission of data in the network stack and transmission of data in the network adaptor, based on the content of the indication signal.

Example 12 is a method including: obtaining, by a network adaptor from a computing device, at least one data indication signal indicating a transmission status of data to be transmitted and being located in at least one queue of a network stack of the computing device, the layer being at least one of a medium access control (MAC) layer or a layer above the MAC layer; determining, at least in part in a MAC or physical (PHY) layer of the network adaptor in a MAC or physical (PHY) layer, a transmit power for transmission of data in the network adaptor, using a time-averaged specific absorption rate (SAR) function that considers at least the data in the network adaptor and the at least one data indication signal.

Example 13 is the subject matter of Example 12, wherein the determined transmit power may not cause a time-averaged SAR of transmission power over an averaging sliding window covering transmission of data in the network adaptor and potential transmission of data in the at least one queue of the computing device to exceed a threshold limit.

Example 14 is the subject matter of Example 12 or 13, wherein determining the transmit power may include optimally allocating transmit power budget between transmission for the data in the network and transmission for the data located in at least one queue so as to maximize amount of time-averaged SAR budget used for averaging sliding window covering transmission of data in the network adaptor and potential transmission of data in the at least one queue.

Example 15 is the subject matter of any of Examples 12 to 14, wherein determining the transmit power using the time-averaged SAR function may include: determining an amount of future energy indicating an amount of an energy budget available for transmission of the data in the network adaptor and data in the computing device; determining a target power based on the determined future energy; and determining at least a portion of the determined target power to be the transmit power for the data in network adaptor based on the data in the network adaptor and the one or more data indication signals.

Example 16 is the subject matter of Example 14 or 15, wherein optimally allocating transmit power may include allocating a majority of the target power budget to the transmit power for transmission of data in the network adaptor.

Example 17 is the subject matter of any of Examples 12 to 16, wherein obtaining, by the network adaptor, at least one data indication signal may include, obtaining, by the computing device, a trigger signal, and sending the at least one data indication signal to the network adaptor in response to obtaining the trigger signal.

Example 18 is the subject matter of any of Examples 12 to 17, wherein the computing device may be operably coupled to the network adaptor via a communication interface, and wherein sending the one or more indication signals may include sending the at least one data indication signal to a MAC or PHY layer of the network adaptor via the communication interface.

Example 19 is the subject matter of any of Examples 12 to 18, wherein the at least one data indication signal may further indicate a quantity of data in one or more queue buffers in the at least one upper layer that are occupied by data.

Example 20 is the subject matter of any of Examples 12 to 19, wherein the at least one data indication signal may further indicate a quality of service (QoS) demand associated with data to be transmitted.

Example 21 is the subject matter of any of Examples 12 to 20, wherein the at least one data indication signal may further indicate a throughput demand associated with the data to be transmitted.

Example 22 is the subject matter of any of Examples 12 to 21, wherein the at least one data indication signal may further indicate one or more categories associated with the data to be transmitted.

Example 23 is the subject matter of any of Examples 12 to 22, which may further include: transmitting, by the network adaptor, data in the network adaptor at the determined transmit power.

Example 24 is a non-transitory computer-readable medium containing instructions that when executed by at least one processor cause the at least one processor to: obtain, from a computing device, at least one data indication signal indicating a transmission status of data to be transmitted and being located in at least one queue of a network stack of the computing device, the layer being at least one of a medium access control (MAC) layer or a layer above the MAC layer; determine, in a MAC or PHY layer of network adaptor, by using a time-averaged specific absorption rate (SAR) function, a maximum transmit power for transmission of data in the network adaptor based at least on the data in the network adaptor and the at least one data indication signal.

Example 25 is the subject matter of Example 24, wherein the determined transmit power may not cause a time-averaged SAR of transmission power over an averaging sliding window covering transmission of data in the network adaptor and potential transmission of data in the at least one queue of the computing device to exceed a threshold limit.

Example 26 is the subject matter of Example 24 or 25, wherein to determine the transmit power may include to optimally allocate transmit power budget between transmission for the data in the network and transmission for the data located in at least one queue so as to maximize amount of time-averaged SAR budget used for averaging sliding window covering transmission of data in the network adaptor and potential transmission of data in the at least one queue.

Example 27 is the subject matter of any of Examples 24 to 26, wherein to determine the transmit power using the time-averaged SAR function may include: to determine an amount of future energy indicating an amount of an energy budget available for transmission of the data in the network adaptor and data in the computing device; to determine a target power based on the determined future energy; and to determine at least a portion of the determined target power to be the transmit power for the data in network adaptor based on the data in the network adaptor and the one or more data indication signals.

Example 28 is the subject matter of Example 26 or 27, wherein to optimally allocate transmit power may include to allocate a majority of the target power budget to the transmit power for transmission of data in the network adaptor.

Example 29 is the subject matter of any of Examples 24 to 28, wherein to obtain, by the network adaptor, at least one data indication signal may include, to obtain, by the computing device, a trigger signal, and to send the at least one data indication signal to the network adaptor in response to obtaining the trigger signal.

Example 30 is the subject matter of any of Examples 24 to 29, wherein the computing device may be operably coupled to the network adaptor via a communication interface, and wherein to send the one or more indication signals may include to send the at least one data indication signal to a MAC or PHY layer of the network adaptor via the communication interface.

Example 31 is the subject matter of any of Examples 24 to 30, wherein the at least one data indication signal may further indicate a quantity of data in one or more queue buffers in the at least one upper layer that are occupied by data.

Example 32 is the subject matter of any of Examples 24 to 31, wherein the at least one data indication signal may further indicate a quality of service (QoS) demand associated with data to be transmitted.

Example 33 is the subject matter of any of Examples 24 to 32, wherein the at least one data indication signal may further indicate a throughput demand associated with the data to be transmitted.

Example 34 is the subject matter of any of Examples 24 to 33, wherein the at least one data indication signal may further indicate one or more categories associated with the data to be transmitted.

Example 35 is the subject matter of any of Examples 24 to 34, wherein the instructions when executed by at least one processor may further cause the at least one processor to: transmit, by the network adaptor, data in the network adaptor at the determined transmit power.

Example 36 is an apparatus comprising means for obtaining, in a network adaptor from a computing device, at least one data indication signal indicating a transmission status of data to be transmitted and being located in at least one queue of a network stack of the computing device, the layer being at least one of a medium access control (MAC) layer or a layer above the MAC layer; means for determining, in a MAC or physical (PHY) layer of the network adaptor in a MAC or physical (PHY) layer, a transmit power for transmission of data in the network adaptor, using a time-averaged specific absorption rate (SAR) function that considers at least the data in the network adaptor and the at least one data indication signal.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A wireless device comprising:
   a network adaptor;
   a computing device operably coupled to the network adaptor, the computing device configured to:
   send at least one data indication signal to the network adaptor, the at least one data indication signal indicating a transmission status of data to be transmitted and being located in at least one queue of a layer of a network stack of the computing device, the layer being at least one of a medium access control (MAC) layer or a layer above the MAC layer;
   wherein the network adaptor is configured to:
   determine, in a MAC or physical (PHY) layer of the network adaptor using a time-averaged specific absorption rate (SAR) function, a transmit power for transmission of data in the network adaptor based on at least the data in the network adaptor and the at least one data indication signal, and
   determine transmit power that does not cause a time-averaged SAR of transmission power over an averaging sliding window covering transmission of data in the network adaptor and potential transmission of data in the at least one queue to exceed a threshold limit.

2. The wireless device of claim 1, wherein to determine the transmit power using the time-averaged SAR function comprises to:
   determine an amount of future energy indicating an amount of an energy budget available for transmission of the data in the network adaptor and data in the computing device for a sliding window, determine a target power for the sliding window based on the determined future energy; and determine at least a portion of the determined target power to be the transmit power based on the data in the network adaptor and the one or more data indication signals.

3. The wireless device of claim 1, wherein the transmit power is determined so that transmission power is allocated between transmission for the data in the network and transmission for the data located in at least one queue so as to maximize an amount of time-averaged SAR budget used for over averaging sliding window covering transmission of data in the network adaptor and transmission of data in the at least one queue.

4. The wireless device of claim 1,
wherein the computing device is operably coupled to the network adaptor via a communication interface;
wherein the computing device is configured to send the at least one data indication signal to the MAC or PHY layer of the network adaptor via the communication interface.

5. The wireless system of claim 1,
wherein the at least one data indication signal further indicates a quantity of data in the at least one queue in the network stack of the computing device that are buffering the data to be transmitted.

6. The wireless system of claim 1,
wherein the at least one data indication signal further indicates a quality of service (QoS) demand associated with the data to be transmitted.

7. The wireless system of claim 1,
wherein the at least one data indication signal further indicates a throughput demand associated with the data to be transmitted.

8. The wireless system of claim 1, wherein the at least one data indication signal further indicates one or more categories associated with the data to be transmitted.

9. The wireless system of claim 1, wherein the network adaptor is further configured to wirelessly transmit the data in the network adaptor at the determined transmit power.

10. The wireless system of claim 1, wherein to determine the transmit power for transmission of data in the network adaptor comprises to allocate in a weighted manner transmission power between transmission of data in the network stack and transmission of data in the network adaptor, based on the content of the indication signal.

11. A method comprising:
obtaining, by a network adaptor from a computing device, at least one data indication signal indicating a transmission status of data to be transmitted and being located in at least one queue of a layer of a network stack of the computing device, the layer being at least one of a medium access control (MAC) layer or a layer above the MAC layer;
determining, in a MAC or physical (PHY) layer of the network adaptor in a MAC or physical (PHY) layer, a transmit power for transmission of data in the network adaptor, using a time-averaged specific absorption rate (SAR) function based on at least the data in the network adaptor and the at least one data indication signal,
wherein determining the transmit power using the time-averaged SAR function comprises:
determining an amount of future energy indicating an amount of an energy budget available for transmission of the data in the network adaptor and data in the computing device,
determining a target power based on the determined future energy; and
determining at least a portion of the determined target power to be the transmit power for the data in network adaptor based on the data in the network adaptor and the one or more data indication signals.

12. The method of claim 11, wherein the determined transmit power does not cause a time-averaged SAR of transmission power over an averaging sliding window covering transmission of data in the network adaptor and potential transmission of data in the at least one queue of the computing device to exceed a threshold limit.

13. A non-transitory computer-readable medium containing instructions that when executed by at least one processor cause the at least one processor to:
obtain, from a computing device, at least one data indication signal indicating a transmission status of data to be transmitted and being located in at least one queue of a layer of a network stack of the computing device, the layer being at least one of a medium access control (MAC) layer or a layer above the MAC layer, wherein the at least one data indication signal indicates a data load of the network stack;
determine, in a MAC or PHY layer of network adaptor, by using a time-averaged specific absorption rate (SAR) function, a maximum transmit power for transmission of data in the network adaptor based on at least on the data in the network adaptor and the at least one data indication signal,
wherein to determine the transmit power comprises to optimally allocate transmit power budget between transmission for the data in the network and transmission for the data located in the at least one queue so as to maximize an amount of time-averaged SAR budget used for averaging sliding window covering transmission of data in the network adaptor and potential transmission of data in the at least one queue.

14. The computer-readable medium of claim 13,
wherein the determined transmit power does not cause a time-averaged SAR of transmission power over an averaging sliding window covering transmission of data in the network adaptor and potential transmission of data in the at least one queue of the computing device to exceed a threshold limit.

15. The computer-readable medium of claim 13,
wherein to determine the transmit power using the time-averaged SAR function comprises:
to determine an amount of future energy indicating an amount of an energy budget available for transmission of the data in the network adaptor and data in the computing device; to determine a target power based on the determined future energy, and
to determine at least a portion of the determined target power to be the transmit power for the data in network adaptor based on the data in the network adaptor and the one or more data indication signals.

16. The computer-readable medium of claim 13,
wherein to optimally allocate transmit power comprises to allocate a majority of the target power budget to the transmit power for transmission of data in the network adaptor.

17. The computer-readable medium of claim 13,
wherein to obtain, by the network adaptor, at least one data indication signal comprises, to obtain, by the computing device, a trigger signal, and to send the at least one data indication signal to the network adaptor in response to obtaining the trigger signal.

* * * * *